(12) United States Patent
Ichien

(10) Patent No.: US 10,733,853 B2
(45) Date of Patent: *Aug. 4, 2020

(54) CROWD GUIDING DEVICE, CROWD GUIDING SYSTEM, CROWD GUIDING METHOD, AND STORAGE MEDIUM

(71) Applicant: NEC Corporation, Minato-ku, Tokyo (JP)

(72) Inventor: Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 15/567,397

(22) PCT Filed: Apr. 15, 2016

(86) PCT No.: PCT/JP2016/002060
§ 371 (c)(1),
(2) Date: Oct. 18, 2017

(87) PCT Pub. No.: WO2016/170767
PCT Pub. Date: Oct. 27, 2016

(65) Prior Publication Data
US 2018/0114416 A1      Apr. 26, 2018

(30) Foreign Application Priority Data

Apr. 20, 2015 (JP) .................................. 2015-086004

(51) Int. Cl.
*G01C 21/34* (2006.01)
*G08B 7/06* (2006.01)
(Continued)

(52) U.S. Cl.
CPC ............. *G08B 7/066* (2013.01); *G01C 21/20* (2013.01); *G06Q 30/0201* (2013.01);
(Continued)

(58) Field of Classification Search
CPC ............... B60Q 5/006; G01C 21/3626; G01C 21/3697; G01C 21/34; G01C 21/20; G06T 7/11; G08B 7/006; G06Q 50/26
See application file for complete search history.

(56) References Cited

U.S. PATENT DOCUMENTS 9,262,734 B2 *  2/2016  Augenstein ...... G06Q 10/06314
2002/0167408 A1   11/2002  Trajkovic et al.
(Continued)

FOREIGN PATENT DOCUMENTS

JP      8-161292 A     6/1996
JP      2002-297757 A  10/2002
(Continued)

OTHER PUBLICATIONS

Boukas et al., Robot Guided Crowd Evacuation, 2014, IEEE, p. 739-751 (Year: 2014).*

(Continued)

*Primary Examiner* — McDieunel Marc

(57) ABSTRACT

Provided is a technology for enhancing movement efficiency and safety overall without depending on a person's experience or intuition, when a guidance instruction is given to a crowd. A crowd index calculating unit calculates an index regarding safety of a crowd and an index regarding movement efficiency of the crowd on the basis of crowd information on the crowd in target areas. Further, a crowd allocation determining unit determines allocation of the crowd in guidance spots to the target areas on the basis of the indexes calculated for the respective target areas. Further, a guidance instruction determining unit is provided with the guidance instruction determining unit that determines, for each guidance spot, details of a guidance instruction based on the determined allocation.

20 Claims, 13 Drawing Sheets

(51) Int. Cl.
    *G06Q 30/06*     (2012.01)
    *G06Q 30/02*     (2012.01)
    *G01C 21/20*     (2006.01)
    *G06Q 50/26*     (2012.01)

(52) U.S. Cl.
    CPC ............ *G06Q 30/06* (2013.01); *G06Q 50/26* (2013.01); *G08B 7/06* (2013.01)

(56) References Cited

U.S. PATENT DOCUMENTS

| | | | |
|---|---|---|---|
| 2014/0289011 A1* | 9/2014 | Rubin | G06Q 40/00 705/7.31 |
| 2017/0010106 A1* | 1/2017 | Shashua | G01C 21/32 |
| 2019/0272431 A1* | 9/2019 | Oami | G08G 1/005 |

FOREIGN PATENT DOCUMENTS

| | | |
|---|---|---|
| JP | 2003-296869 A | 10/2003 |
| JP | 2004-178358 A | 6/2004 |
| JP | 2004-534999 A | 11/2004 |
| JP | 2006-171943 A | 6/2006 |
| JP | 2008-21030 A | 1/2008 |
| JP | 4409980 B2 | 2/2010 |
| JP | 2013-73300 A | 4/2013 |

OTHER PUBLICATIONS

Yuan, Crowd Monitoring Using Mobile Phones, 2014, IEEE, p. 261-264 (Year: 2014).*
Li et al., Fast Detection of Independent Motion in Crowds Guided by Supervised Learning, 2007, IEEE, p. 341-344 (Year: 2007).*
Mitsumasa Okada, "Safety Technology for Crowd", Kajima Institute Publishing Co., Ltd., May 11, 2011, pp. 103 to 108 (6 pages total).
International Search Report dated May 31, 2016 issued by the International Searching Authority in international application No. PCT/JP2016/002060.
Written Opinion dated May 31, 2016 issued by the International Searching Authority in international application No. PCT/JP2016/002060.

* cited by examiner

Fig. 6

| TARGET AREA ID | CROWD MOVEMENT SPEED | CROWD DENSITY | AREA INFORMATION |
|---|---|---|---|

Fig. 7

| GUIDANCE SPOT ID | RELEVANT AREA | GUIDANCE RECOMMENDED AREA | SPOT INFORMATION |
|---|---|---|---|

Fig. 11

| GUIDANCE SPOT ID | RELEVANT AREA | GUIDANCE RECOMMENDED AREA | SPOT INFORMATION |
|---|---|---|---|
| P1 | A1, A2 | | ... |
| P2 | A1, A2, A3 | | ... |
| P3 | A2, A3 | | ... |

Fig. 12

| TARGET AREA ID | CROWD MOVEMENT SPEED | CROWD DENSITY | AREA INFORMATION |
| --- | --- | --- | --- |
| A1 | 6 | 6 | ... |
| A2 | 4 | 7 | ... |
| A3 | 2 | 11 | ... |

Fig. 13

| GUIDANCE SPOT ID | RELEVANT AREA | GUIDANCE RECOMMENDED AREA | SPOT INFORMATION |
|---|---|---|---|
| P1 | A1, A2 | A1 | ... |
| P2 | A1, A2, A3 | A1 | ... |
| P3 | A2, A3 | A2 | ... |

CROWD GUIDING DEVICE, CROWD GUIDING SYSTEM, CROWD GUIDING METHOD, AND STORAGE MEDIUM

This application is a National Stage Entry of PCT/JP2016/002060 filed on Apr. 15, 2016, which claims priority from Japanese Patent Application 2015-086004 filed on Apr. 20, 2015, the contents of all of which are incorporated herein by reference, in their entirety.

TECHNICAL FIELD

The present invention relates to a technique of guiding a crowd.

BACKGROUND ART

There is a phenomenon in which movement of a crowd that is an assemblage of many people may concentrate in a particular area and a particular time zone, when an event and the like are held. Such a phenomenon includes, for example, movement to a stadium when a sports match is held, movement to a site when a festival such as a fireworks show is held, and the like. Such movement of a crowd requires guidance in consideration of rapidness of movement and safety.

A density of people is an index considered important as safety of a crowd (see NPL 1). The higher a density of people is, the more each person experiences discomfort due to compression. In addition, there is also a reported case in which a much higher density of people may lead to death in worst cases due to difficulty in breathing and unconsciousness. In addition, when a density of people becomes high, falling of a certain person may cause falling of a subsequent crowd, which is also likely to cause an accident such as falling like dominoes.

PTL 1 describes one example of a technique that is related to such a problem in movement of a crowd. The related technique described in PTL 1 assists in drafting a guarding plan by predicting turnout of people in a surrounding spot of an event site and a target guard area. Specifically, this related technique measures flow of people in a surrounding spot relevant to turnout of people, by performing image processing on a video that is obtained from a camera disposed in the surrounding spot. Then, this related technique predicts, based on inflow and outflow data on expected turnout of people in an inflow and outflow spot such as a transportation facility relevant to turnout of people, and an actual measured value of the flow of people measured in the surrounding spot, flow of people in a subsequent surrounding spot and turnout of people in a target guard area.

In addition, PTL 2 describes another example of a technique that is related to the problem in movement of a crowd. The related technique described in PTL 2 determines a congestion degree of a space by detecting a human body with an infrared sensor, and displays the congestion degree on a display device and the like. Specifically, this related technique calculates, as a congestion degree, a rate (an area ratio and the like) of a human-body-existing area detected in a target space. For example, this related technique determines a congestion degree in a train, and notifies in advance a passenger of the congestion degree by displaying the congestion degree on a display device on a vehicle side face.

In addition, PTL 3 describes another example of a technique that is related to the problem in movement of a crowd. The related technique described in PTL 3 provides, to a portable information terminal possessed by a guard deployed in each spot, a means of counting and summing up the number of people getting off at a nearby station of an event site, and accessing, in real time, data on the number of getting-off people obtained by the sum up.

In addition, PTL 4 describes another example of a technique that is related to the problem in movement of a crowd. The related technique described in PTL 4 presents a menu screen to a terminal possessed by a visitor to an exhibition hall, in display priority depending on a congestion degree of each exhibition booth. Specifically, this related technique counts the number of accesses from terminals possessed by visitors to a menu representing each exhibition booth, and lowers the display priority of a menu with a large number of accesses.

In addition, PTL 5 describes another example of a technique that is related to the problem in movement of a crowd. The related technique described in PTL 5 determines a method of guiding to a plurality of evacuation routes, in evacuation guidance from a facility to an evacuation place. Specifically, this related technique predicts, based on an arrival pattern of a user to a facility and a dwell time distribution database, a congestion degree and a congestion peak amount of the facility. Then, this related technique predicts, by distributing the congestion peak amount of the facility to respective evacuation routes in accordance with a set guidance method, a congestion degree and a congestion peak amount of each of the evacuation routes. Then, this related technique determines, by predicting the congestion degree and the congestion peak amount of each of the evacuation routes while varying a guidance method, a guidance method that minimizes the congestion peak amount of each of the evacuation routes.

In addition, PTL 6 describes another example of a technique that is related to the problem in movement of a crowd. The related technique described in PTL 6 presents a path that minimizes cost for passing through a series of destinations, based on a congestion degree of each of different locations in a shopping center, a movement speed and a movement direction of a shopper, a length of a queue, and the like. Specifically, this related technique calculates, from video data, a congestion degree of each of a plurality of spots as destinations of a user, a movement speed and a movement direction, a length of a queue, and the like. Then, this related technique calculates and presents, by using information obtained from the video data, a path that further lowers cost based on time, a distance, and the like while taking in consideration a delay and the like due to congestion.

CITATION LIST

Patent Literature

[NPL 1] Mitsumasa OKADA, "Safety Technology for Crowd", Kajima Institute Publishing Co., Ltd., May 11, 2011, pp. 103 to 108

Patent Literature

[PTL 1] Japanese Laid-open Patent Publication No. 2004-178358
[PTL 2] Japanese Laid-open Patent Publication No. H8-161292
[PTL 3] Japanese Laid-open Patent Publication No. 2002-297757
[PTL 4] Japanese Patent No. 4409980
[PTL 5] Japanese Laid-open Patent Publication No. 2006-171943

[PTL 6] Japanese Translation of PCT International Publication No. 2004-534999

SUMMARY OF INVENTION

Technical Problem

However, the above-described related techniques have problems below.

The related technique described in PTL 1 predicts and presents turnout of people in a surrounding spot of an event site and a target guard area, but a guarding plan using presented information is up to a user (an organizer). Thus, this related technique alone is unable to carry out guidance for enhanced movement efficiency and safety giving an overview of the entire surrounding region of the event site.

In addition, the related technique described in PTL 2 presents a determined congestion degree of a space (a train and the like), but a movement destination depending on the presented congestion degree is up to a user (a passenger and the like). Thus, this related technique alone is unable to carry out guidance for enhanced movement efficiency and safety giving an overview of the entire space.

In addition, the related technique described in PTL 3 presents data on the number of people getting off at a nearby station of an event site to a portable information terminal of a guard in real time, but a safe and efficient guarding content using the data on the number of getting-off people is up to a user (a guard). Thus, this related technique alone is unable to carry out guidance for enhanced movement efficiency and safety giving an overview of the entirety from the nearby station to the event site.

In addition, the related technique described in PTL 4 lowers display priority of a menu of an exhibition booth with a high congestion degree, but selection of an exhibition booth to be actually visited is up to a user (a visitor). Thus, this related technique alone is unable to carry out guidance for enhanced efficiency and safety giving an overview of the entire exhibition hall.

In addition, the related technique described in PTL 5 determines a guiding method in advance, based on a predicted congestion degree and a predicted congestion peak amount, but is not suitable in application to guidance in consideration of an actual congestion degree of a moving crowd. In addition, this related technique determines a method of guiding to a plurality of independent evacuation routes, but it is often difficult to make a model of paths to a destination as independent routes, since the paths may branch and merge midway. Thus, this related technique is difficult to be applied when a model of paths to a destination cannot be made as a plurality of independent paths.

In addition, the related technique described in PTL 6 carries out guidance in consideration of a congestion degree, a movement speed, and the like, but aims at minimization of cost based on time and a distance with no consideration of cost based on safety.

The present invention has been made in order to solve the above-described problems. In other words, an object of the present invention is to provide a technique of enhancing overall movement efficiency and safety, without depending on a person's experience and intuition, when a guidance instruction is given to a crowd.

Solution to Problem

To achieve the above object, a crowd guiding device according to the present invention includes:

crowd index calculating means for calculating, based on crowd information that is information relating to a crowd in each of target areas, an index relating to safety of the crowd and an index relating to movement efficiency of the crowd;

crowd allocation determining means for determining, based on each of the indexes calculated for each of the target areas, allocation of a crowd in each of guidance spots to each of the target areas; and guidance instruction determining means for determining, for each of the guidance spots, a guidance instruction content based on the determined allocation.

Further, a crowd guiding system according to the present invention includes:

the crowd guiding device described above;

crowd information acquiring means for acquiring the crowd information of each of the target areas; and guidance instruction outputting means for outputting information that represents the guidance instruction content for each of the guidance spots.

Further, a crowd guiding method according to the present invention includes:

by crowd information acquiring means, acquiring crowd information that is information relating to a crowd in each of target areas;

by a crowd guiding device, calculating, based on the crowd information, an index relating to safety of the crowd and an index relating to movement efficiency of the crowd, for each of the target areas, determining, based on each of the indexes calculated for each of the target areas, allocation of a crowd in each of guidance spots to each of the target areas, and determining, for each of the guidance spots, a guidance instruction content based on the determined allocation; and by guidance instruction outputting means, outputting information that represents the guidance instruction content for each of guidance spots.

Another crowd guiding method according to the present invention includes:

by a crowd guiding device, calculating, based on crowd information that is information relating to a crowd in each of target areas, an index relating to safety of the crowd and an index relating to movement efficiency of the crowd;

determining, based on each of the indexes calculated for each of the target areas, allocation of a crowd in each of guidance spots to each of the target areas; and determining, for each of the guidance spots, a guidance instruction content based on the determined allocation.

A storage medium according to the present invention stores a crowd guiding program that causes a computer to execute:

a crowd index calculating step that calculates, based on crowd information that is information relating to a crowd in each of target areas, an index relating to safety of the crowd and an index relating to movement efficiency of the crowd;

a crowd allocation determining step that determines, based on each of the indexes calculated for each of the target areas, allocation of a crowd in each of guidance spots to each of the target areas; and a guidance instruction determining step that determines, for each of the guidance spots, a guidance instruction content based on the determined allocation.

Advantageous Effects of Invention

The present invention is able to provide a technique of giving a guidance instruction in such a way as to enhance overall movement efficiency and safety, without depending on a person's experience and intuition, when a guidance instruction is given to a crowd.

BRIEF DESCRIPTION OF DRAWINGS

FIG. 6 is a diagram illustrating one example of items included in a target area information table, according to the second example embodiment of the present invention;

FIG. 7 is a diagram illustrating one example of items included in a guidance spot information table, according to the second example embodiment of the present invention;

FIG. 11 is a diagram illustrating one example of information included in advance in a guidance spot information table, according to the specific example of the second example embodiment of the present invention;

FIG. 12 is a diagram illustrating one example of a target area information table that stores a density of a crowd and a movement speed of the crowd calculated according to the specific example of the second example embodiment of the present invention;

FIG. 13 is a diagram illustrating one example of a guidance spot information table that stores a guidance recommended area determined according to the specific example of the second example embodiment of the present invention.

DESCRIPTION OF EMBODIMENTS

Example embodiments of the present invention will be described below in detail with reference to the drawings.

First Example Embodiment

Figure 1:
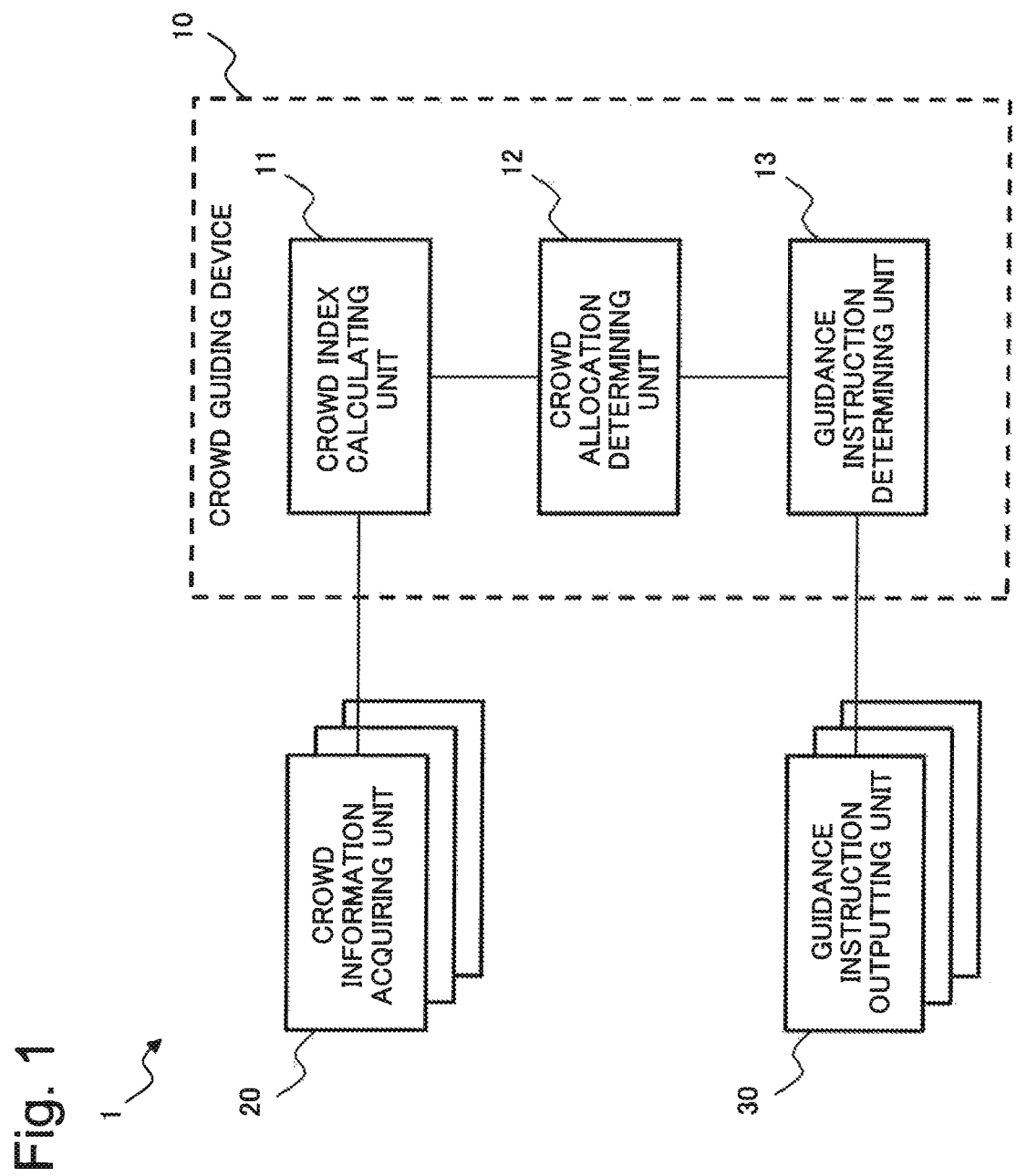
FIG. 1 is a block diagram illustrating a configuration of a crowd guiding system as a first example embodiment of the present invention.

FIG. 1 illustrates a function block configuration of a crowd guiding system 1 as a first example embodiment of the present invention. In FIG. 1, the crowd guiding system 1 includes a crowd guiding device 10, one or more crowd information acquiring units 20, and one or more guidance instruction outputting units 30. The crowd guiding device 10 is connected with each of the crowd information acquiring units 20 and each of the guidance instruction outputting units 30 respectively in a communicable manner. In addition, the crowd guiding device 10 includes a crowd index calculating unit 11, a crowd allocation determining unit 12, and a guidance instruction determining unit 13. Note that FIG. 1 illustrates three crowd information acquiring units 20 and three guidance instruction outputting units 30, but the number of crowd information acquiring units and the number of guidance instruction outputting units are not limited in the present example embodiment.

Figure 2:
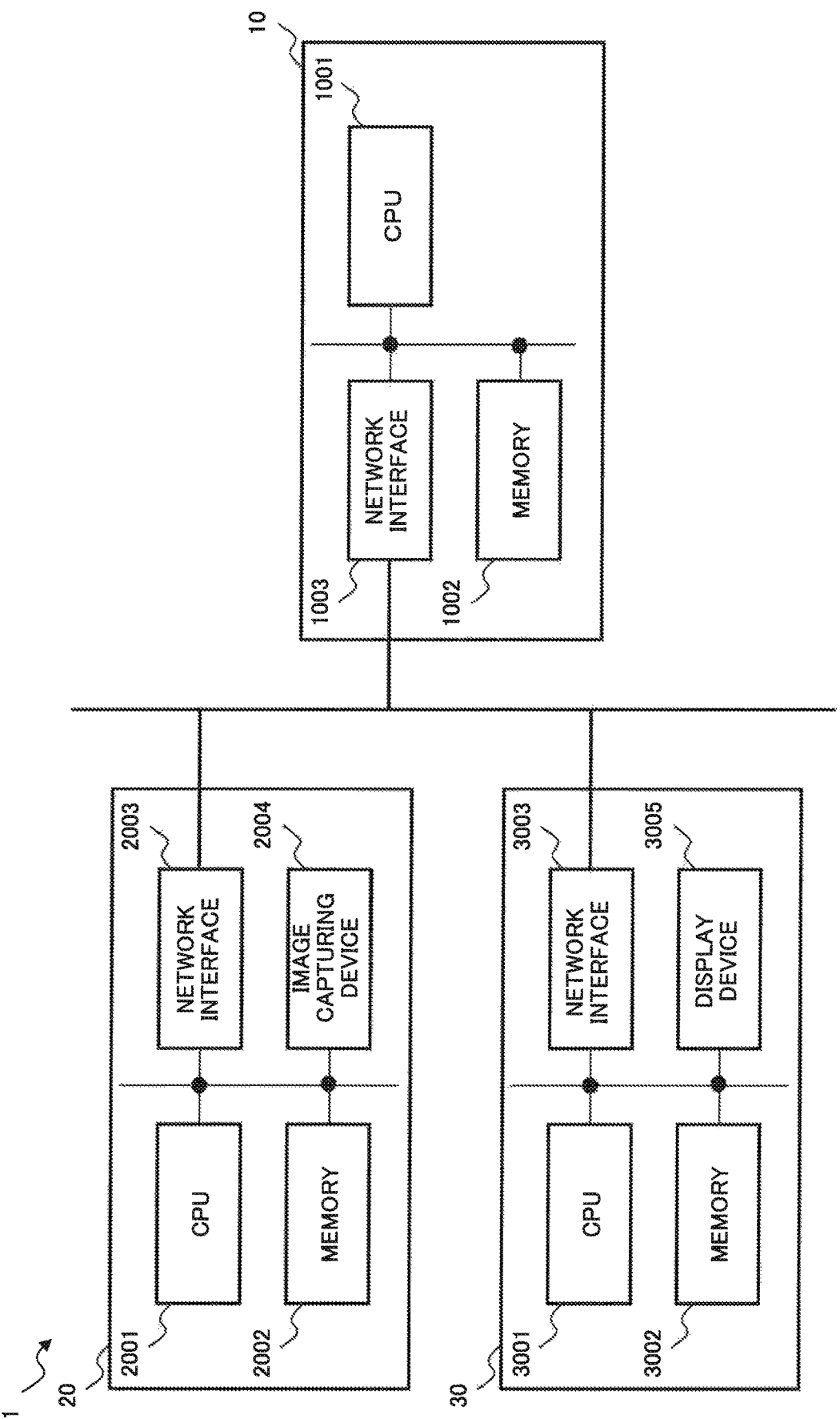
FIG. 2 is a diagram illustrating one example of a hardware configuration of the crowd guiding system as the first example embodiment of the present invention.

Herein, FIG. 2 illustrates one example of a hardware configuration of the crowd guiding system 1. In FIG. 2, the crowd guiding device 10 is constituted by a device that includes a Central Processing Unit (CPU) 1001, a memory 1002, and a network interface 1003. The memory 1002 is constituted by a Random Access Memory (RAM), a Read Only Memory (ROM), an auxiliary storage device (a hard disk and the like), and the like. The memory 1002 stores a computer program for causing the device to function as the crowd guiding device 10 according to the present example embodiment, and various types of data. The network interface 1003 is an interface that connects to the Internet, a Local Area Network (LAN), a public circuit network, a radio communication network, or a network configured by a combination and the like thereof.

In this case, each function block of the crowd guiding device 10 is constituted by the CPU 1001 that reads and executes the computer program and the various types of data stored in the memory 1002 and controls each unit such as the network interface 1003.

In addition, in FIG. 2, the crowd information acquiring unit 20 is constituted by a device that includes a CPU 2001, a memory 2002, a network interface 2003, and an image capturing device 2004. Examples of such a device include, for example, a monitoring camera, but are not limited thereto. In this case, the crowd information acquiring units 20 are respectively disposed, for respective target areas to be described later, in such a way that each of the target areas is within an image-capturing range. The memory 2002 stores a computer program for causing the device to function as the crowd information acquiring unit 20 according to the present example embodiment, and various types of data. The network interface 2003 is an interface that connects to the Internet, a LAN, a public circuit network, a radio communication network, or a network configured by a combination and the like thereof.

In this case, the crowd information acquiring unit 20 is implemented by the CPU 2001 that reads and executes the computer program and the various types of data stored in the memory 2002 and controls the network interface 2003 and the image capturing device 2004.

In addition, in FIG. 2, the guidance instruction outputting unit 30 is constituted by a device that includes a CPU 3001, a memory 3002, a network interface 3003, and a display device 3005. Examples of such a device include, for example, an electric bulletin board, but are not limited thereto. In this case, the guidance instruction outputting units 30 are disposed in respective guidance spots to be described later, in a way that an output thereof can be recognized by a crowd approaching the guidance spot. The memory 3002 stores a computer program for causing the device to function as the guidance instruction outputting unit 30 according to the present example embodiment, and various types of data. The network interface 3003 is an interface that connects to the Internet, a LAN, a public circuit network, a radio communication network, or a network configured by a combination and the like thereof.

In this case, the guidance instruction outputting unit 30 is implemented by the CPU 3001 that reads and executes the computer program and the various types of data stored in the memory 3002 and controls the network interface 3003 and the display device 3005.

Figure 3:
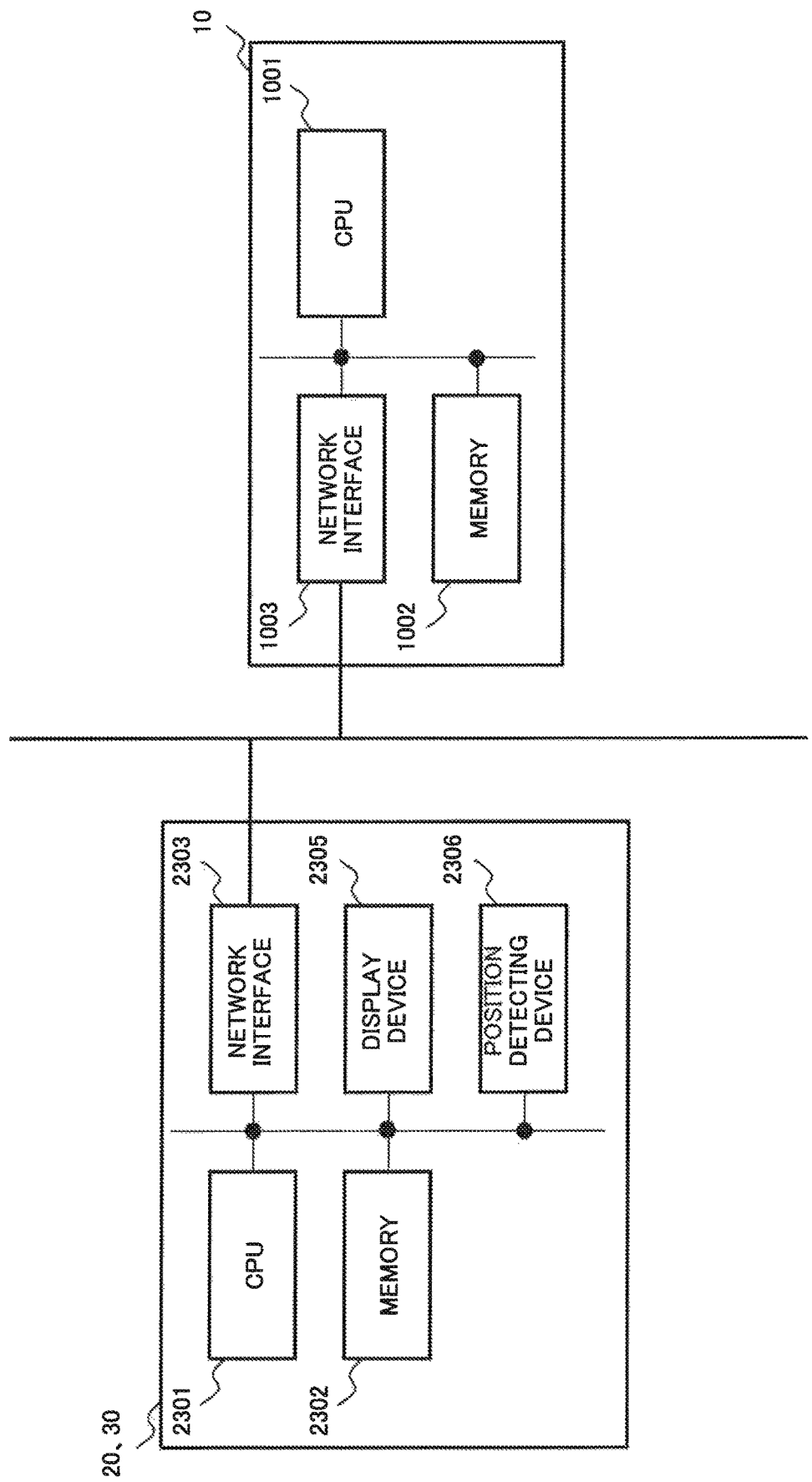
FIG. 3 is a diagram illustrating another example of a hardware configuration of the crowd guiding system as the first example embodiment of the present invention.

In addition, FIG. 3 illustrates another example of a hardware configuration of the crowd guiding system 1. In FIG. 3, a hardware configuration of the crowd information acquiring unit 20 and the guidance instruction outputting unit 30 is different from the hardware configuration illustrated in FIG. 2. In FIG. 3, the crowd information acquiring unit 20 and the guidance instruction outputting unit 30 are constituted by a portable device that includes a CPU 2301, a memory 2302, a network interface 2303, a display device 2305, and a position detecting device 2306. Examples of such a device include, for example, a portable information terminal, but are not limited thereto. In this case, the crowd information acquiring units 20 and the guidance instruction outputting units 30 are carried by respective persons included in a crowd. The memory 2302 stores a computer program for causing the device to function as the crowd information acquiring unit 20 and the guidance instruction outputting unit 30 according to the present example embodiment, and various types of data. The network interface 2303 is an interface that connects to the Internet, a LAN, a public circuit network, a radio communication network, or a network configured by a combination and the like thereof.

In this case, the crowd information acquiring unit 20 is implemented by the CPU 2301 that reads and executes the computer program and the various types of data stored in the memory 2302 and controls the network interface 2303 and the position detecting device 2306. In addition, in this case, the guidance instruction outputting unit 30 is implemented by the CPU 2301 that reads and executes the computer program and the various types of data stored in the memory 2302 and controls the network interface 2303 and the display device 2305.

Note that the hardware configuration of the crowd guiding system 1 is not limited to the above-described configuration.

Next, each function block of the crowd guiding system 1 will be described in detail.

The crowd information acquiring unit 20 acquires crowd information that is information relating to a crowd in each target area. A target area is an area that is determined in advance as a target for which a state of a crowd is grasped. Crowd information is information that represents a state of a crowd.

For example, a case will be described in which the crowd information acquiring unit 20 is constituted by a device that includes the image capturing device 2004 as illustrated in FIG. 2. In this case, as described above, the crowd information acquiring unit 20 is disposed in such a way as to capture an image of a target area with the image capturing device 2004. In this case, the crowd information acquiring unit 20 acquires a video of the target area as crowd information. The video of the target area may be a moving image, or may be a still image. In addition, the crowd information acquiring unit 20 transmits the acquired crowd information to the crowd guiding device 10. Such acquisition and transmission of crowd information is performed every predetermined timing.

In addition, for example, a case will be described in which the crowd information acquiring unit 20 is constituted by a portable device as illustrated in FIG. 3. In this case, as described above, the crowd information acquiring unit 20 is carried by a person included in a crowd. In this case, the crowd information acquiring unit 20 detects a position of the own device by using the position detecting device 2306 and the like. In addition, the crowd information acquiring unit 20 transmits, to the crowd guiding device 10, acquired positional information as crowd information. Such acquisition and transmission of crowd information is performed every predetermined timing.

The guidance instruction outputting unit 30 outputs a guidance instruction content that is determined by the crowd guiding device 10 to be described later, for each guidance spot. Herein, a guidance spot is a spot that is determined in advance to indicate a movement destination to a crowd.

For example, a case will be described in which the guidance instruction outputting unit 30 is constituted by a device that includes the display device 3005 as illustrated in FIG. 2. In this case, as described above, the guidance instruction outputting unit 30 is disposed in each guidance spot, in a way that an output from the display device 3005 can be recognized by a crowd approaching the guidance spot. Then, the guidance instruction outputting unit 30 may display, on the display device 3005, a guidance instruction content that is determined by the crowd guiding device 10 for the guidance spot in which the own device is disposed.

In addition, for example, a case will be described in which the guidance instruction outputting unit 30 is constituted by a portable device that includes the display device 2305 as illustrated in FIG. 3. In this case, as described above, the crowd information acquiring unit 20 is carried by a person included in a crowd. In view of this, the guidance instruction outputting unit 30 may display, on the display device 2305, a guidance instruction content that is determined by the crowd guiding device 10 for a guidance spot on a path through which the own device goes.

The crowd index calculating unit 11 calculates, based on crowd information of each target area, an index relating to safety of a crowd and an index relating to movement efficiency of the crowd.

Note that, when crowd information is a video (a time series of moving images or still images) of a target area, the crowd index calculating unit 11 calculates an index relating to safety and an index relating to movement efficiency of a crowd in the target area, by analyzing the video of the target area. In addition, when crowd information is positional information of each person included in a crowd, the crowd index calculating unit 11 calculates an index relating to safety and an index relating to movement efficiency in a target area, by analyzing the positional information included in the target area and a time series thereof.

The crowd allocation determining unit 12 determines, based on each of the indexes calculated for each target area, allocation of a crowd in each guidance spot to each target area. For example, for a crowd reaching a guidance spot, the crowd allocation determining unit 12 may determine a rate of allocation to one or more target areas to which guidance is possible from the guidance spot.

The guidance instruction determining unit 13 determines, for each guidance spot, a guidance instruction content based on the determined allocation. For example, for a path from a guidance spot toward a target area with a larger rate of allocation, the guidance instruction determining unit 13 may determine such an instruction content that guides more persons. In addition, for example, for a path toward a target area whose rate of allocation from a guidance spot is zero, the guidance instruction determining unit 13 may determine an instruction content that gives recognition that the path is a not-recommended path.

An operation of the thus-configured crowd guiding system 1 will be described in detail with reference to FIG. 4. Note that, in FIG. 4, it is assumed that a left figure indicates an operation of the crowd information acquiring unit 20, a center figure indicates an operation of the crowd guiding device 10, and a right figure indicates an operation of the guidance instruction outputting unit 30.

First, the crowd information acquiring unit 20 acquires crowd information of each target area, and transmits the acquired crowd information to the crowd guiding device 10 (Step S1).

Next, the crowd index calculating unit 11 of the crowd guiding device 10 calculates, based on the received crowd information, an index relating to safety of a crowd and an index relating to movement efficiency of the crowd, for each target area (Step S2).

Next, the crowd allocation determining unit 12 of the crowd guiding device 10 determines, based on each of the indexes of each target area calculated in Step S2, allocation of a crowd in each guidance spot to each target area (Step S3).

Next, the guidance instruction determining unit 13 of the crowd guiding device 10 determines, for each guidance spot, a guidance instruction content based on the determined allocation, and transmits the determined guidance instruction content to the guidance instruction outputting unit 30 (Step S4).

Next, the guidance instruction outputting unit 30 outputs the guidance instruction content for each guidance spot (Step S5).

The operation of the crowd guiding system 1 is thus ended.

Figure 4:
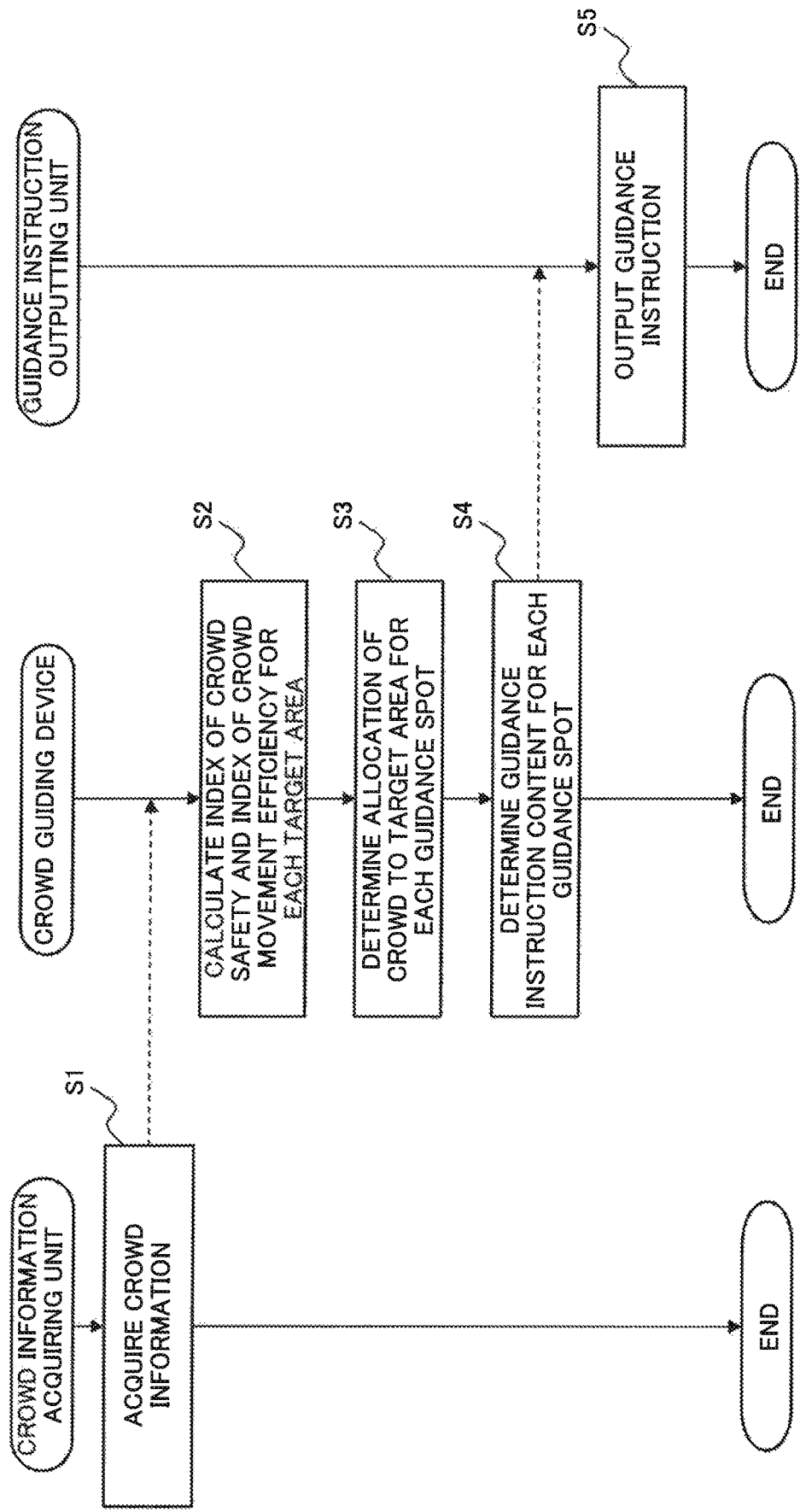
FIG. 4 is a flowchart describing an operation of the crowd guiding system as the first example embodiment of the present invention.

Note that, in the operation illustrated in FIG. 4, each processing from Steps S1 to S5 may be performed in this order, or may be performed asynchronously by the respective function blocks. When being performed asynchronously, each processing from Steps S1 to S5 is executed by each function block every predetermined timing. Then, each function block needs to operate by using information most recently calculated, determined, or acquired in another function block.

Next, an advantageous effect of the first example embodiment of the present invention will be described.

The crowd guiding system as the first example embodiment of the present invention is able to guide a crowd in such a way as to enhance overall movement efficiency and safety, without depending on a person's experience and intuition.

The reason is that the crowd information acquiring unit acquires crowd information of each target area, and the crowd index calculating unit calculates, based on the crowd information of each target area, an index relating to safety and an index relating to movement efficiency of a crowd in the target area. Then, the reason is also that the crowd allocation determining unit determines, based on each of the indexes calculated for each target area, allocation of a crowd in each guidance spot to each target area. Then, the reason is also that the guidance instruction determining unit determines a guidance instruction content, based on the allocation of the crowd determined for each guidance spot, and the guidance instruction outputting unit outputs the guidance instruction content determined for each guidance spot.

Therefore, the present example embodiment is able to determine, for each of guidance spots, allocation of a crowd in each guidance spot to a target area on a path from the guidance spot, in such a way as to further enhance movement efficiency of a crowd in the target area while maintaining safety of the crowd. Then, since a guidance instruction is given based on the thus-determined allocation, the present example embodiment is able to further enhance movement efficiency of a crowd while maintaining safety of the crowd.

Second Example Embodiment

Next, a second example embodiment of the present invention will be described in detail with reference to the drawings. Note that, throughout the respective drawings to be referred in description of the present example embodiment, the same configurations and steps operating in the same way as those in the first example embodiment of the present invention are assigned with the same reference numerals, and detailed description therefor will be omitted in the present example embodiment.

Figure 5:
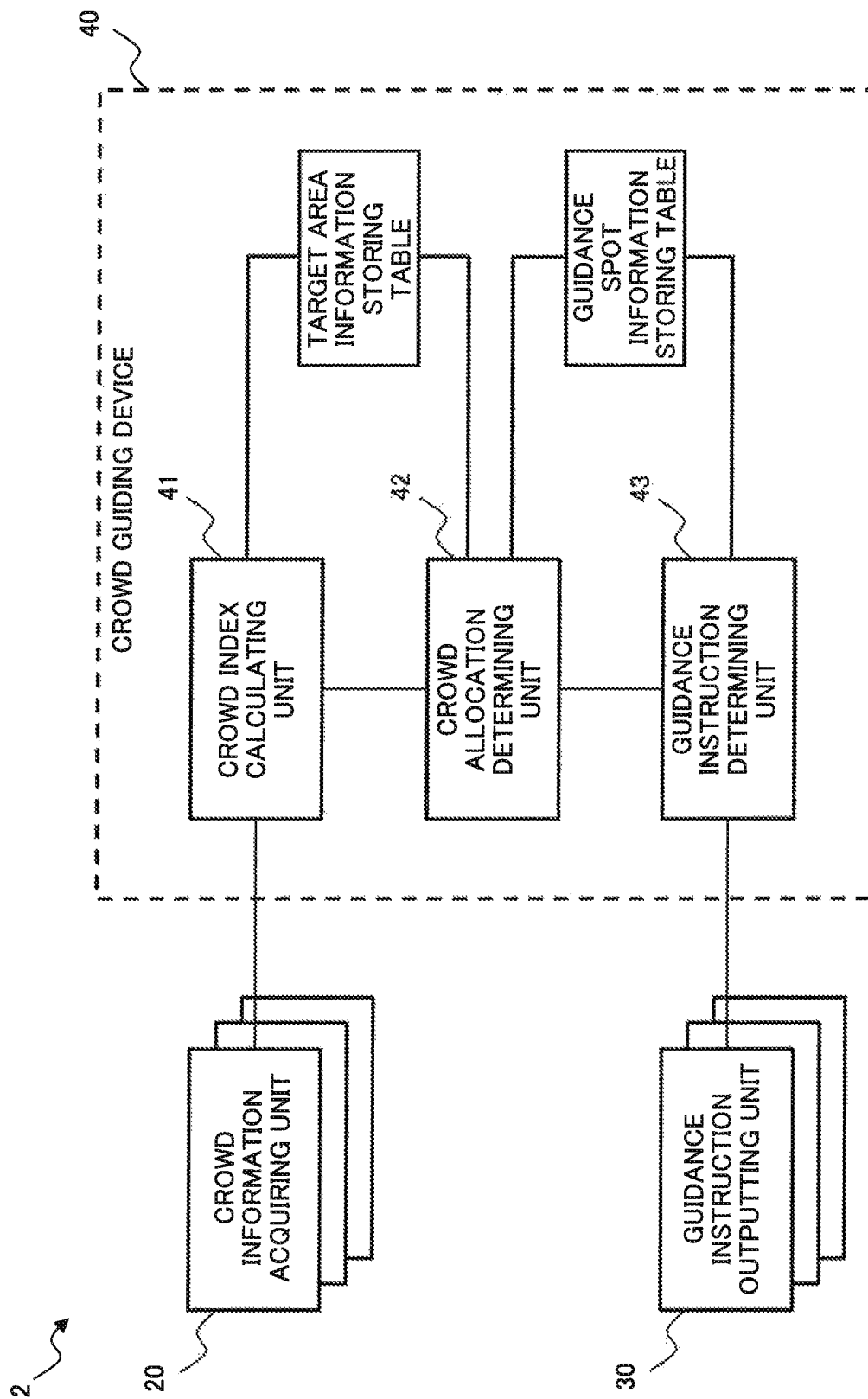
FIG. 5 is a block diagram illustrating a configuration of a crowd guiding system as a second example embodiment of the present invention.

First, FIG. 5 illustrates a configuration of a crowd guiding system 2 as the second example embodiment of the present invention. In FIG. 5, the crowd guiding system 2 is different from the crowd guiding system 1 as the first example embodiment of the present invention, in that the crowd guiding system 2 includes a crowd guiding device 40 in place of the crowd guiding device 10. In addition, the crowd guiding device 40 includes a crowd index calculating unit 41, a crowd allocation determining unit 42, and a guidance instruction determining unit 43.

Note that the crowd guiding system 2 and each function block thereof can be configured by the same hardware elements as those in the first example embodiment of the present invention described with reference to FIG. 2 or 3. However, a hardware configuration of the crowd guiding system 2 and each function block thereof is not limited to the above-described configuration.

Next, each function block of the crowd guiding device 40 will be described.

The crowd index calculating unit 41 calculates, based on crowd information of each target area, a density of a crowd as an index relating to safety of the crowd. A density of a crowd represents a degree of concentration of persons in a target area. In addition, the crowd index calculating unit 41 calculates, based on crowd information of each target area, a movement speed of a crowd as an index relating to movement efficiency of the crowd. A movement speed of a crowd represents a speed at which a crowd moves in a target area. If crowd information is a video (a time series of moving images or still images), the crowd index calculating unit 41 is capable of calculating a density and a movement speed of a crowd, by performing image analysis on the video of a target area. In addition, if crowd information is positional information of a person included in a crowd, the crowd index calculating unit 41 is capable of calculating a density and a movement speed of the crowd, by analyzing the positional information included in a target area and a time series thereof.

For example, the crowd index calculating unit 41 may store a density and a movement speed of a crowd calculated for each target area in a target area information table. FIG. 6 illustrates one example of items included in a target area information table. In FIG. 6, the target area information table includes, for each target area, identification information (target area ID) of the target area, and information that represents a density of a crowd and a movement speed of the crowd, respectively. Besides the above, the target area information table may include information (area information) that represents a geographical range determined as the target area, and the like.

The crowd allocation determining unit 42 stores in advance, for each guidance spot, target areas (relevant areas) that may be a guidance destination from the guidance spot.

For example, the crowd allocation determining unit 42 may store relevant areas in a guidance spot information table for each guidance spot. FIG. 7 illustrates one example of items included in a guidance spot information table. In FIG. 7, the guidance spot information table includes, for each guidance spot, identification information (guidance spot ID) of the guidance spot, information that represents relevant areas of the guidance spot, and information that represents a guidance recommended area to be described later. In addition, the guidance spot information table may further include, for each guidance spot, information (spot information) that represents a geographical position of the guidance spot, and the like.

In addition, the crowd allocation determining unit 42 determines, as allocation of a crowd in each guidance spot to each target area, a guidance recommended area among the relevant areas, based on a guidance recommendation value. It is assumed that the guidance recommended area is an area that is recommended as a guidance destination of a crowd from a guidance spot. For example, the crowd allocation determining unit 42 may determine an area with a highest guidance recommendation value among the relevant areas, as being the guidance recommended area. In addition, for example, the crowd allocation determining unit 42 may store the guidance recommended area determined for each guidance spot in the guidance spot information table in FIG. 7.

Herein, the guidance recommendation value represents a strength of recommendation as a guidance destination. The crowd allocation determining unit 42 is capable of calculating the guidance recommendation value, based on an index relating to safety (a density of a crowd) and an index relating to movement efficiency (a movement speed of a crowd).

For example, the guidance recommendation value is calculated by the following expression (1).

$$\text{Guidance Recommendation Value} = (\alpha \times \text{Movement Speed of Crowd}) \times (\beta / \text{Density of Crowd}) \quad (1)$$

Herein, "/" represents division. In addition, α and β are weight parameters for respective items. According to the expression (1), the higher a movement speed of a crowd is (the higher movement efficiency is), and the lower a density of a crowd is (the higher safety is), the greater a guidance recommendation value is.

Note that the crowd allocation determining unit 42 may determine a guidance recommended area among the relevant areas for each guidance spot while excluding a target area for which an index relating to safety (a density of a crowd) does not satisfy a predetermined safety condition. For example, the crowd allocation determining unit 42 may apply, as a safety condition, a condition that a density of a crowd is equal to or less than a threshold value, and may exclude a target area in which a density of a crowd exceeds the threshold value.

The guidance instruction determining unit 43 determines a specific guidance instruction content, based on the guidance recommended area determined for each guidance spot. For example, the guidance instruction determining unit 43 may determine a guidance instruction content "Display information visually representing a direction from the guidance spot to the guidance recommended area". Examples of information visually representing a direction to the guidance recommended area include a sign representing an arrow, a figure, an illustration, or the like, but are not limited thereto. In addition, for example, the guidance instruction determining unit 43 may determine a guidance instruction content "Display information guiding a direction from the guidance spot to the guidance recommended area by means of a text". Besides the above, for a guidance spot having no guidance recommended area, the guidance instruction determining unit 43 may determine a guidance instruction content "Display information visually representing (or guiding by means of a text) that inflow to any relevant areas ahead is stopped".

An operation of the thus-configured crowd guiding system 2 will be described with reference to the drawings. Herein, an outline of the operation of the crowd guiding system 2 is substantially the same as the operation in the first example embodiment of the present invention described with reference to FIG. 4. However, in the present example embodiment, details of a crowd index calculation process in Step S2, a crowd allocation determination process in Step S3, and a guidance instruction determination process in Step S4 are different from those in the first example embodiment of the present invention.

Figure 8:
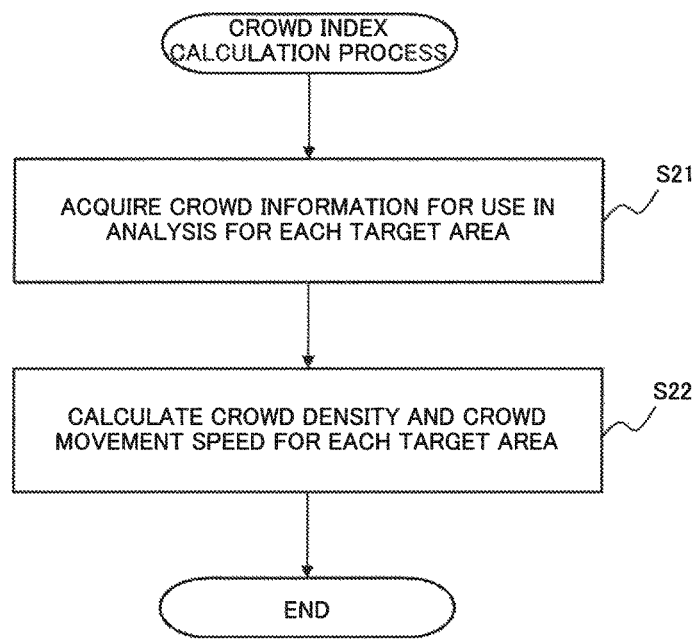
FIG. 8 is a flowchart describing a crowd index calculation operation of the crowd guiding system as the second example embodiment of the present invention.

First, FIG. 8 illustrates a detail of a crowd index calculation process in Step S2.

In FIG. 8, first, the crowd index calculating unit 41 acquires, for each target area, crowd information for use in analysis, among pieces of crowd information received from the crowd information acquiring unit 20 (Step S21).

Next, the crowd index calculating unit 41 calculates, for each target area, a density of a crowd and a movement speed of the crowd, based on the crowd information (Step S22). The calculated density and the movement speed of the crowd for each target area are stored in a target area information table.

The crowd index calculating unit 41 executes the above-described operation repeatedly every predetermined timing.

For example, a case is assumed in which videos as crowd information are streamed (transmitted in real time) from the crowd information acquiring units 20 disposed in one or more target areas. In this case, the crowd index calculating unit 41 selects, every predetermined timing, a video of a predetermined period relating to a target area from the streamed videos, analyzes the selected video, and calculates a speed of a crowd and a density of the crowd.

In addition, for example, a case is assumed in which pieces of positional information as crowd information are sequentially uploaded from the crowd information acquiring units 20 carried by persons included in a crowd. In this case, the crowd index calculating unit 41 extracts, every predetermined timing, a piece of positional information of a predetermined period relating to a target area from the uploaded and accumulated pieces of positional information, analyzes the positional information and a time series thereof, and calculates a speed of a crowd and a density of the crowd.

Detailed description of the crowd index calculation process is thus ended.

Figure 9:
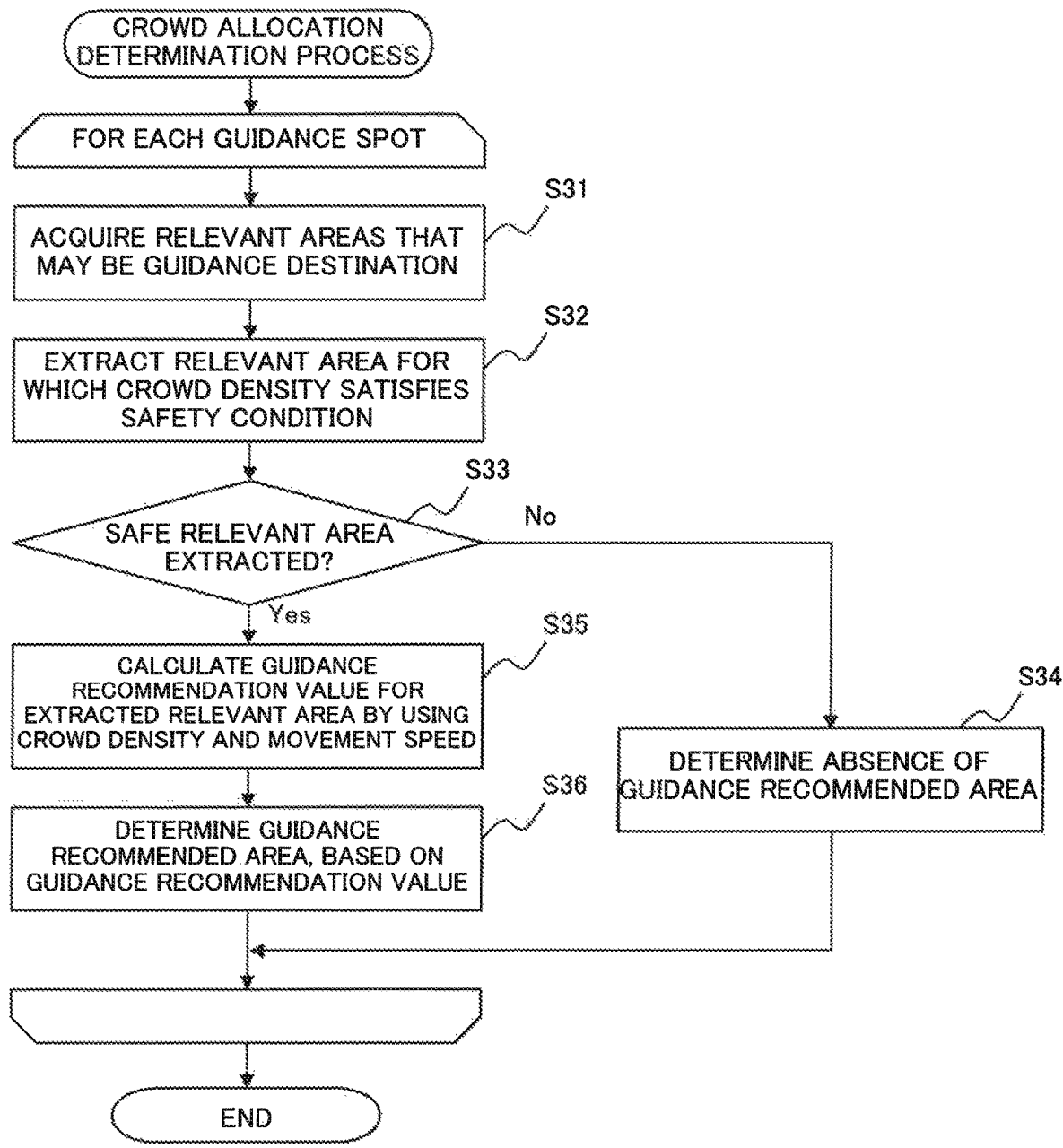
FIG. 9 is a flowchart describing a crowd allocation determination operation of the crowd guiding system as the second example embodiment of the present invention.

Next, FIG. 9 illustrates a detail of a crowd allocation determination process in Step S3.

In FIG. 9, the crowd allocation determining unit 42 performs processing of Steps S31 to S36 for each guidance spot.

Herein, first, the crowd allocation determining unit 42 acquires information representing relevant areas that are target areas to which guidance is possible from the guidance spot (Step S31). The information representing relevant areas can be acquired from a guidance spot information table.

Next, the crowd allocation determining unit 42 extracts relevant areas for which a density of a crowd satisfies a predetermined safety condition, among the relevant areas acquired in Step S31 (Step S32). The density of a crowd in a relevant area can be acquired from a target area information table.

Herein, a case will be described in which no relevant area satisfying the predetermined safety condition is present (No in Step S33). In this case, the crowd allocation determining unit 42 determines that no recommended guidance area is present for the guidance spot (Step S34). Then, information representing absence of a recommended guidance area is stored in the guidance spot information table for the guidance spot.

Meanwhile, a case will be described in which a relevant area is present satisfying the predetermined safety condition (Yes in Step S33). In this case, the crowd allocation determining unit 42 calculates a guidance recommendation value for each of the relevant areas (Step S35). The guidance recommendation value of each relevant area can be calculated by using a density of a crowd in each relevant area and a movement speed of the crowd, which are stored in the target area information table.

Next, the crowd allocation determining unit 42 determines, for the guidance spot, a guidance recommended area from among the relevant areas extracted in Step S32, based on the guidance recommendation value (Step S36). Then, information representing a recommended guidance area is stored in the guidance spot information table for the guidance spot.

The crowd allocation determining unit 42 executes the above-described operation repeatedly every predetermined timing.

Figure 10:
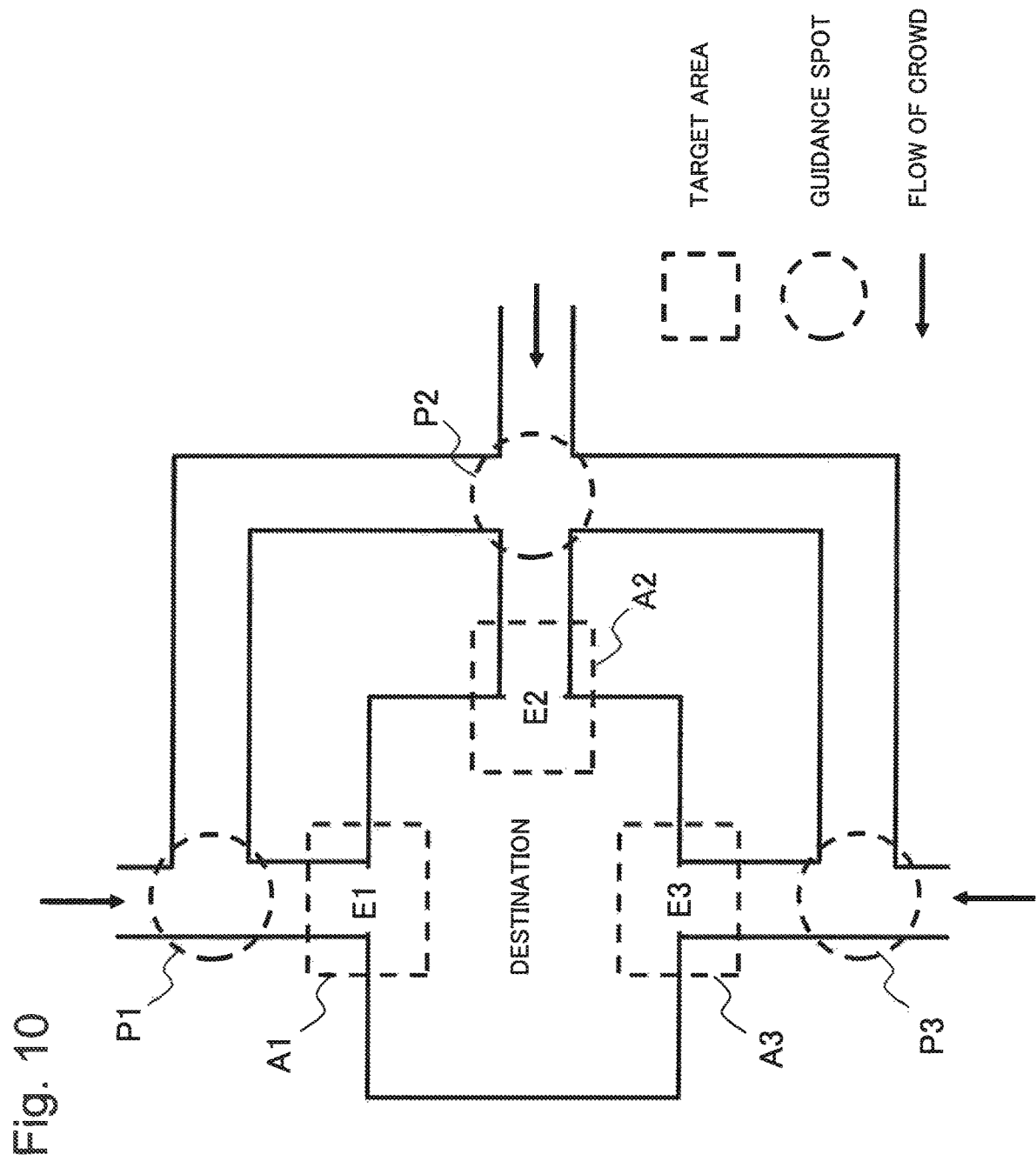
FIG. 10 is a diagram schematically illustrating a structure of areas that are guidance targets, according to a specific example of the second example embodiment of the present invention.

Such a crowd allocation process will be described by using a specific example. In the specific example, a structure of areas to be targets of crowd guidance is as illustrated in FIG. 10. In FIG. 10, there are three locations of entrances E1 to E3 to a destination. In a middle of a path to each of the entrances E1 to E3, there is a path leading to another path. A crowd moves through each path toward the destination. Regarding such areas to be targets of crowd guidance, it is assumed that three locations (target areas A1 to A3) around the respective entrances E1 to E3 to the destination are determined in advance, as target areas in the present example embodiment. In addition, it is assumed that three locations (guidance spots P1 to P3) at branch points of the respective paths are determined in advance as guidance spots.

In this case, it is assumed that relevant areas that may be a guidance destination for the guidance spot P1 are the target areas A1 and A2. In addition, it is assumed that relevant areas that may be a guidance destination for the guidance spot P2 are the target areas A1, A2, and A3. In addition, it is assumed that relevant areas that may be a guidance destination for the guidance spot P3 are the target areas A2 and A3. In other words, a guidance spot information table stores in advance information illustrated in FIG. 11 as an example.

In addition, it is assumed that a safety condition that a density of a crowd is equal to or less than 10 is determined. In addition, it is assumed that a recommendation guidance value is calculated by the above-described expression (1). Note that it is assumed herein that weight parameters $\alpha$ and $\beta$ are both 1.

In such an assumption, it is assumed that a density and a movement speed of a crowd in each of the target areas A1 to A3 are calculated, by the crowd index calculating unit 41, as illustrated in a target area information table in FIG. 12.

In this case, relevant areas of the guidance spot P1 are the target areas A1 and A2. Referring to FIG. 12, since a density of a crowd is equal to or less than 10 for both of the target areas A1 and A2, these target areas satisfy the safety condition. In view of this, the crowd allocation determining unit 42 calculates a guidance recommendation value for each of the two target areas A1 and A2, by using the expression (1). Herein, a guidance recommendation value of 1 is calculated for the target area A1, and a guidance recommendation value of 4/7 is calculated for the target area A2. In view of this, the crowd allocation determining unit 42 determines the guidance target area A1 with the higher guidance recommendation value, as being a guidance recommended area for the guidance spot P1.

In addition, relevant areas of the guidance spot P2 are the target areas A1, A2, and A3. Among these target areas, the target area A3 does not satisfy the safety condition since a density of a crowd exceeds 10. In view of this, the crowd allocation determining unit 42 calculates a guidance recommendation value for each of the two target areas A1 and A2 excluding the target area A3 among the relevant areas of the guidance spot P2, by using the expression (1). Herein, a guidance recommendation value of 1 is calculated for the target area A1, and a guidance recommendation value of 4/7 is calculated for the target area A2. In view of this, the crowd allocation determining unit 42 determines the guidance target area A1 with the higher guidance recommendation value, as being a guidance recommended area for the guidance spot P2.

In addition, relevant areas of the guidance spot P3 are the target areas A2 and A3. Among these target areas, the target area A3 does not satisfy the safety condition since a density of a crowd exceeds 10. In view of this, the crowd allocation determining unit 42 determines the target area A2 excluding the target area A3 among the relevant areas of the guidance spot P3, as being a guidance recommended area for the guidance spot P3. In this way, when there is one remaining relevant area excluding a target area that does not satisfy the safety condition, the crowd allocation determining unit 42 may omit processing of calculating a recommendation guidance value.

Accordingly, guidance recommended areas are determined for the respective guidance spots P1 to P3, and information stored in the guidance spot information table is as illustrated in FIG. 13.

Detailed description of the crowd allocation determination process is thus ended.

Figure 14:
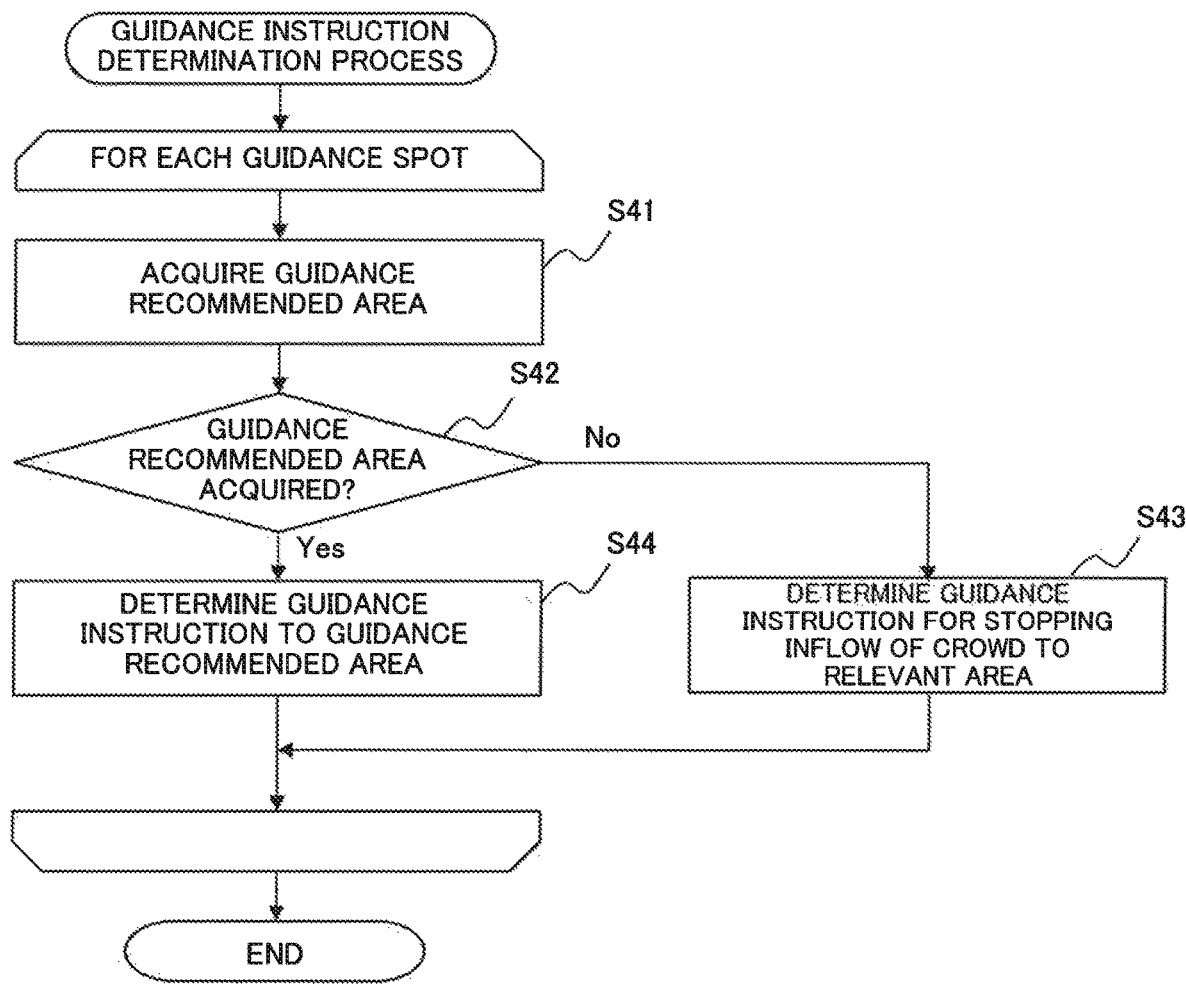
FIG. 14 is a flowchart describing a guidance instruction determination operation of the crowd guiding system as the second example embodiment of the present invention.

Next, FIG. 14 illustrates a detail of a guidance instruction determination process in Step S4.

In FIG. 14, the guidance instruction determining unit 43 performs processing of Steps S41 to S44 for each guidance spot.

In FIG. 14, first, the guidance instruction determining unit 43 acquires, for the guidance spot, information representing a guidance recommended area (Step S41). The information representing a guidance recommended area can be acquired from a guidance spot information table.

Herein, a case will be described in which no guidance recommended area is present for the guidance spot (No in Step S42). In this case, the guidance instruction determining unit 43 determines a guidance instruction content "Display information visually representing (or guiding by means of a text) that inflow to any relevant areas ahead is stopped". Then, the guidance instruction determining unit 43 transmits the guidance instruction content to the guidance instruction outputting unit 30 (Step S43).

Meanwhile, a case will be described in which a guidance recommended area is present for a guidance spot (Yes in Step S42). In this case, the guidance instruction determining unit 43 determines a guidance instruction content "Display information visually representing (or guiding by means of a text) a direction from the guidance spot to the guidance recommended area". Then, the guidance instruction determining unit 43 transmits the guidance instruction content to the guidance instruction outputting unit 30 (Step S44).

The guidance instruction determining unit 43 executes the above-described operation repeatedly every predetermined timing. Detailed description of the guidance instruction determination process is thus ended.

Note that the crowd index calculation process, the crowd allocation calculation process, and the guidance instruction output process described with reference to FIGS. 8, 9, and 14 may be performed asynchronously by the respective function blocks, or all the processes may be performed synchronously. When being performed asynchronously, each function block needs to operate by using information most recently calculated, determined, or acquired in another function block.

Next, an advantageous effect of the second example embodiment of the present invention will be described.

The crowd guiding system as the second example embodiment of the present invention is able to give a guidance instruction to a crowd in such a way as to further enhance overall movement efficiency and safety, without depending on a person's experience and intuition.

The reason is that, additionally to the same configuration as that in the first example embodiment of the present invention, the crowd index calculating unit calculates, for each target area, a density of a crowd as an index relating to safety of the crowd, based on crowd information. In addition, the reason is also that the crowd index calculating unit calculates, for each target area, a movement speed of a crowd as an index relating to movement efficiency of the crowd, based on crowd information. Then, the crowd allocation determining unit calculates a movement recommendation value based on the density and the movement speed of a crowd for each target area. Then, the reason is also that the crowd allocation determining unit determines, for each guidance spot, a guidance recommended area among target areas to which guidance is possible from the guidance spot, based on the movement recommendation value. In addition, the reason is also that, when determining the guidance recommended area, the crowd allocation determining unit excludes a target area for which a density of a crowd does not satisfy a predetermined safety condition. Then, the reason is also that the guidance instruction determining unit determines a guidance instruction content to a recommended guidance area for each guidance spot.

Therefore, the present example embodiment is able to determine, for each guidance spot, a guidance destination of a crowd and give a guidance instruction, in such a way as to further enhance movement efficiency of a crowd in a target area ahead while maintaining safety of the crowd, even when a plurality of paths through which the crowd moves have a branch, a merge, and the like.

As described above, the present example embodiment is effective, particularly in a case in which there are a plurality of paths to a destination of a crowd having a branch, a merge, and the like, and in which a guidance instruction is desired to be given while grasping, in real time, a status of a moving crowd, rather than a previous simulation.

Note that, in the present example embodiment, an example has been described in which a density of a crowd is employed as an index relating to safety of the crowd, and in which a movement speed of a crowd is employed as an index relating to movement efficiency of the crowd. Without limitation thereto, other indexes that can be calculated by analysis of crowd information may be applied as an index relating to safety of a crowd and an index relating to a movement speed of the crowd.

In addition, in the present example embodiment, an example has been described in which the crowd allocation determining unit calculates a guidance recommendation value by using the expression (1), but a calculation expression of the guidance recommendation value is not limited thereto. The guidance recommendation value may be calculated by using a calculation expression that gives a higher result for a higher index relating to safety of a crowd and a higher index relating to movement efficiency of the crowd, respectively.

In addition, in the present example embodiment, an example has been described in which the crowd allocation determining unit determines, based on a guidance recommendation value, one guidance recommended area for each guidance spot, but the number of the guidance recommended area is not limited to one. For example, the crowd allocation determining unit may determine one or more guidance recommended areas for each guidance spot. In addition, when a plurality of guidance recommended areas are determined for a certain guidance spot, the guidance instruction determining unit may give the same guidance instruction to the plurality of guidance recommended areas. Alternatively, the guidance instruction determining unit may determine such an instruction content that guides a crowd to the plurality of guidance recommended areas with allocation based on guidance recommendation values.

In addition, in the present example embodiment, an example has been described in which the crowd index calculating unit, the crowd allocation determining unit, and the guidance instruction determining unit function by using a target area information table and a guidance spot information table. However, a data structure of information used, determined, or calculated by each of the function blocks is not limited.

In addition, in the present example embodiment, as a predetermined safety condition, a condition based on a threshold value of a density of a crowd has been described as an example, but the predetermined safety condition is not limited thereto. For example, the predetermined safety condition may be a condition further taking into consideration of a movement speed of a crowd, a time zone, a characteristic of a crowd, and the like, additionally to a density of a crowd. As described above, the predetermined safety condition may be a condition further taking into account of other information, additionally to an index relating to safety of a crowd.

In addition, in each of the above-described example embodiments of the present invention, an example has been described in which crowd information is constituted by a video or positional information of a person, but the crowd information may be other types of information. For example, the crowd information may be voice information collected by a microphone disposed in a target area, or may be acceleration, a movement direction, and the like detected by a portable information terminal carried by a person. In addition, the crowd information may be a combination of such various types of information that allows analysis of a status of a crowd.

In addition, in each of the above-described example embodiments of the present invention, an example has been described in which the guidance instruction outputting unit displays a guidance instruction content on a display device disposed in a target area, or on a display device of a terminal carried by a person. Without limitation thereto, the guidance instruction outputting unit may output a guidance instruction content to another output device. For example, the guidance instruction outputting unit may output a guidance instruction content from a speaker disposed in a target area, or from a speaker of a terminal carried by a person.

In addition, in each of the above-described example embodiments of the present invention, an example has been mainly described in which each of the function blocks of the crowd guiding system is implemented by a CPU that executes a computer program stored in a storage device or a ROM. Without limitation thereto, part or all of the function blocks, or a combination thereof may be implemented by dedicated hardware.

In addition, in each of the above-described example embodiments of the present invention, the function blocks of the crowd guiding system may be implemented by a plurality of devices in a distributed manner.

In addition, in each of the above-described example embodiments of the present invention, the operation of the crowd guiding device described with reference to each of the flowcharts is stored, as a computer program according to the present invention, in a storage device (a storage medium) of a computer device. Then, the computer program may be read and executed by the CPU. Then, in such a case, the present invention is configured by a code of the computer program, or by a storage medium.

In addition, the above-described example embodiments can be carried out in combination as appropriate.

In addition, the present invention is not limited to the above-described example embodiments, but can be carried out in various modes.

In the above, the present invention has been described by using each of the above-described example embodiments as an exemplary example. However, the present invention is not limited to the above-described example embodiments. In other words, various modes that a person skilled in the art can understand can be applied to the present invention within the scope of the present invention.

This application is based upon and claims the benefit of priority from Japanese Patent Application No. 2015-086004, filed on Apr. 20, 2015, the disclosure of which is incorporated herein in its entirety.

REFERENCE SIGNS LIST 1, 2 Crowd guiding system
10, 40 Crowd guiding device
11, 41 Crowd index calculating unit
12, 42 Crowd allocation determining unit
13, 43 Guidance instruction determining unit
20 Crowd information acquiring unit
30 Guidance instruction outputting unit
1001, 2001, 3001, 2301 CPU
1002, 2002, 3002, 2302 Memory
1003, 2003, 3003, 2303 Network interface
2004 Image capturing device
3005, 2305 Display device
2306 Position detecting device

What is claimed is:

1. A crowd guiding device comprising:
a memory storing instructions; and
one or more processors configured to execute the instructions to:
calculate, based on crowd information that is information relating to a crowd in each of target areas, an index relating to safety of the crowd and an index relating to movement efficiency of the crowd;
determine, based on each of the indexes calculated for each of the target areas, allocation of a crowd in each of guidance spots to each of the target areas; and
determine, for each of the guidance spots, a guidance instruction content based on the determined allocation.

2. The crowd guiding device according to claim 1, wherein
the one or more processors are further configured to execute the instructions to:
determine allocation of the crowd in each of the guidance spots while excluding a target area for which the index based on safety does not satisfy a predetermined safety condition.

3. The crowd guiding device according to claim 2, wherein
the one or more processors are further configured to execute the instructions to:
calculate, for each of the target areas, a guidance recommendation value that represents a degree of recommendation based on each of the indexes as a guidance destination from the guidance spot, and determines, based on the calculated guidance recommendation value, allocation of the crowd in each of the guidance spots.

4. The crowd guiding device according to claim 2, wherein
the one or more processors are further configured to execute the instructions to:
determine, as allocation of the crowd in each of the guidance spots, a guidance recommended area that is recommended as a guidance destination from the guidance spot.

5. The crowd guiding device according to claim 2, wherein
the one or more processors are further configured to execute the instructions to:
calculate information that represents a density of the crowd as the index relating to safety.

6. The crowd guiding device according to claim 2, wherein
the one or more processors are further configured to execute the instructions to:
calculate information that represents a movement speed of the crowd as the index relating to movement efficiency.

7. The crowd guiding device according to claim 1, wherein
the one or more processors are further configured to execute the instructions to:
calculate, for each of the target areas, a guidance recommendation value that represents a degree of recommendation based on each of the indexes as a guidance destination from the guidance spot, and determines, based on the calculated guidance recommendation value, allocation of the crowd in each of the guidance spots.

8. The crowd guiding device according to claim 7, wherein
the one or more processors are further configured to execute the instructions to:
determine, as allocation of the crowd in each of the guidance spots, a guidance recommended area that is recommended as a guidance destination from the guidance spot.

9. The crowd guiding device according to claim 7, wherein
the one or more processors are further configured to execute the instructions to:
calculate information that represents a density of the crowd as the index relating to safety.

10. The crowd guiding device according to claim 7, wherein
the one or more processors are further configured to execute the instructions to:
calculate information that represents a movement speed of the crowd as the index relating to movement efficiency.

11. The crowd guiding device according to claim 1, wherein
the one or more processors are further configured to execute the instructions to:
determine, as allocation of the crowd in each of the guidance spots, a guidance recommended area that is recommended as a guidance destination from the guidance spot.

12. The crowd guiding device according to claim 11, wherein
the one or more processors are further configured to execute the instructions to:
calculate information that represents a density of the crowd as the index relating to safety.

13. The crowd guiding device according to claim 11, wherein
the one or more processors are further configured to execute the instructions to:
calculate information that represents a movement speed of the crowd as the index relating to movement efficiency.

14. The crowd guiding device according to claim 1, wherein
the one or more processors are further configured to execute the instructions to:
calculate information that represents a density of the crowd as the index relating to safety.

15. The crowd guiding device according to claim 14, wherein
the one or more processors are further configured to execute the instructions to:
calculate information that represents a movement speed of the crowd as the index relating to movement efficiency.

16. The crowd guiding device according to claim 1, wherein
the one or more processors are further configured to execute the instructions to:
calculate information that represents a movement speed of the crowd as the index relating to movement efficiency.

17. A crowd guiding system comprising:
the crowd guiding device according to claim 1;
the one or more processors are further configured to execute the instructions to:
acquire the crowd information of each of the target areas; and
output information that represents the guidance instruction content for each of the guidance spots.

18. A crowd guiding method comprising:
by crowd information acquiring device,
acquiring crowd information that is information relating to a crowd in each of target areas;
by a crowd guiding device,
calculating, based on the crowd information, an index relating to safety of the crowd and an index relating to movement efficiency of the crowd, for each of the target areas,
determining, based on each of the indexes calculated for each of the target areas, allocation of a crowd in each of guidance spots to each of the target areas, and
determining, for each of the guidance spots, a guidance instruction content based on the determined allocation; and
by guidance instruction outputting device,
outputting information that represents the guidance instruction content for each of guidance spots.

19. A crowd guiding method comprising:
by a crowd guiding device,
calculating, based on crowd information that is information relating to a crowd in each of target areas, an index relating to safety of the crowd and an index relating to movement efficiency of the crowd;
determining, based on each of the indexes calculated for each of the target areas, allocation of a crowd in each of guidance spots to each of the target areas; and
determining, for each of the guidance spots, a guidance instruction content based on the determined allocation.

20. A storage medium storing a crowd guiding program that causes a computer to execute:
a crowd index calculating step that calculates, based on crowd information that is information relating to a crowd in each of target areas, an index relating to safety of the crowd and an index relating to movement efficiency of the crowd;
a crowd allocation determining step that determines, based on each of the indexes calculated for each of the target areas, allocation of a crowd in each of guidance spots to each of the target areas; and
a guidance instruction determining step that determines, for each of the guidance spots, a guidance instruction content based on the determined allocation.

* * * * *